United States Patent
Marxrieser et al.

[11] Patent Number: 5,662,566
[45] Date of Patent: Sep. 2, 1997

[54] METHOD AND APPARATUS FOR PRODUCTION OF THREE DIMENSIONAL COMPONENTS

[75] Inventors: Gerhard Marxrieser, Chesapeake, Va.; Erich Alexander Zarzer, Linz, Austria

[73] Assignee: American Gem Corporation, Chesapeake, Va.

[21] Appl. No.: 503,721

[22] Filed: Jul. 17, 1995

[51] Int. Cl.$^6$ .................................................. B23Q 3/157
[52] U.S. Cl. .......................... 483/1; 83/75.5; 364/474.13; 409/132
[58] Field of Search .................... 483/1, 4, 6, 30; 364/474.13, 474.24, 48, 473; 409/131, 132; 83/75.5; 219/121.72, 121.44

[56] References Cited

U.S. PATENT DOCUMENTS

| | | | |
|---|---|---|---|
| 4,107,589 | 8/1978 | Eto et al. | 483/6 |
| 4,611,268 | 9/1986 | Götz et al. | 364/474.13 |
| 5,317,943 | 6/1994 | Dowdle | 409/132 X |
| 5,341,306 | 8/1994 | Fujita et al. | 364/473 |
| 5,430,831 | 7/1995 | Snellen | 364/148 X |
| 5,444,635 | 8/1995 | Blaine | 83/75.5 X |

FOREIGN PATENT DOCUMENTS

| | | |
|---|---|---|
| 0 640 943 A2 | 8/1994 | European Pat. Off. . |
| 0 618 542 A2 | 10/1994 | European Pat. Off. . |
| 9402 | 1/1991 | Japan ................ 364/474.24 |
| 109607 | 5/1991 | Japan ................ 364/474.24 |
| 287807 | 10/1973 | U.S.S.R. ............ 364/474.13 |

OTHER PUBLICATIONS

Westkaemper, et al 3-D Schachtelungs-System fuer die fertigung Klleiner fraesteile ans Platten material publication of May 1, 1993.

R. Neil, CAD/CAM use in numerical control publication dated May 20, 1981.

Primary Examiner—William R. Briggs
Attorney, Agent, or Firm—Hill, Steadman & Simpson

[57] ABSTRACT

A system and method for cutting or milling three dimensional parts with minimal material waste. The system is comprised of a five or six axis machine, which is equipped with an ultrasonic cutting device and/or a routing unit, and is operated by part programs automatically generated by a software system, which minimizes material waste and creates a toolpath for the three dimensional parts to be manufactured.

22 Claims, 4 Drawing Sheets

METHOD AND APPARATUS FOR PRODUCTION OF THREE DIMENSIONAL COMPONENTS

BACKGROUND OF THE INVENTION

The present invention relates in general to a system, a method and device, for the production of three dimensional (3D) components of various materials (e.g. honeycomb, etc.), where material waste is minimized and part programs are automatically generated.

Existing five axis machines are used to produce 3D components, where part programs for single parts are generated with the help of CAD/NC systems. Those five axis machines use the technique of milling to process the surface of the part. Depending on the size of the head and the tool size, material waste is great until one single part at a time is finished.

If two dimensional (2D) parts must be finished, the usage of cutters (laser, waterjet, mechanical knife, ultrasonic cutting) or punching machines, together with nesting systems (a software which is used to calculate the optimal position and rotation of every part to maximize material utilization) for the automatic creation of part programs is well known.

While the technical and economic question to produce a given number of 2D parts with a minimum amount of material is fully answered, the question of the production of several three dimensional parts with optimal material utilization in an automated way is not answered yet.

SUMMARY OF THE INVENTION

The object of the present invention is therefore to provide a device and software tools to process three dimensional parts defined in a CAD system, out of a three dimensional block, with regular or irregular shapes of whatever type of material, like honeycomb, etc., in an automated way, assuring minimal material waste.

According to the first aspect of the present invention, a device is provided: a five or six axis machine, equipped with (a) an ultrasonic cutter optionally capable to mount different types of knives (including but not limited to disc knives, triangular shaped blades, etc.) and milling tools or (b) a high speed spindle for milling tools. This cutting technique allows material savings since, especially for ultrasonic cutting, the tool diameter is nearly zero and therefore patterns can be placed closer together.

According to a second aspect of the present invention, a method is provided for an automated creation of part programs, which assures minimal material waste and drives the device mentioned in the above paragraph. This method is comprised of steps (a) the usage of a standard CAD/NC system to create data files (usually APT or CLDATA file) containing the toolpath information, which is necessary to finish one single three dimensional part, (b) the usage of a new software module, hereafter called "2D mapping", which creates a 2D contour, a hull of the projection of the 3D part onto the X/Y plane and the additional amount of surrounding material removed during the process of cutting and routing (which can already save material, due to the possibility of the three dimensional ultrasonic cutting technique together with the usability of special shaped knives) and (c) the usage of a standard 2D nesting system to allocate the 2D shapes gained by "2D mapping" in an optimal way (minimum material waste).

Although the present invention as described provides an improvement to existing processes by mapping the projection onto the X/Y plane in order to optimally nest the parts in that plane, the invention also contemplates even greater material savings by additional rotations and mappings in the X/Z and Y/Z planes. By utilizing such additional and further mappings in these other two perpendicular planes, the three dimensional parts can be optimally positioned within the material from which they will be removed by the cutting devices.

The result of the nesting system, the X, Y and Z position and the angle of rotation, where and in which rotation the part has to be finished together with the CAD/NC files containing the toolpath information, is used to automatically create part programs, which will allow the production of a certain number of possibly different parts in an optimal way.

DETAILED DESCRIPTION OF THE PREFERRED EMBODIMENTS

Figure 7:
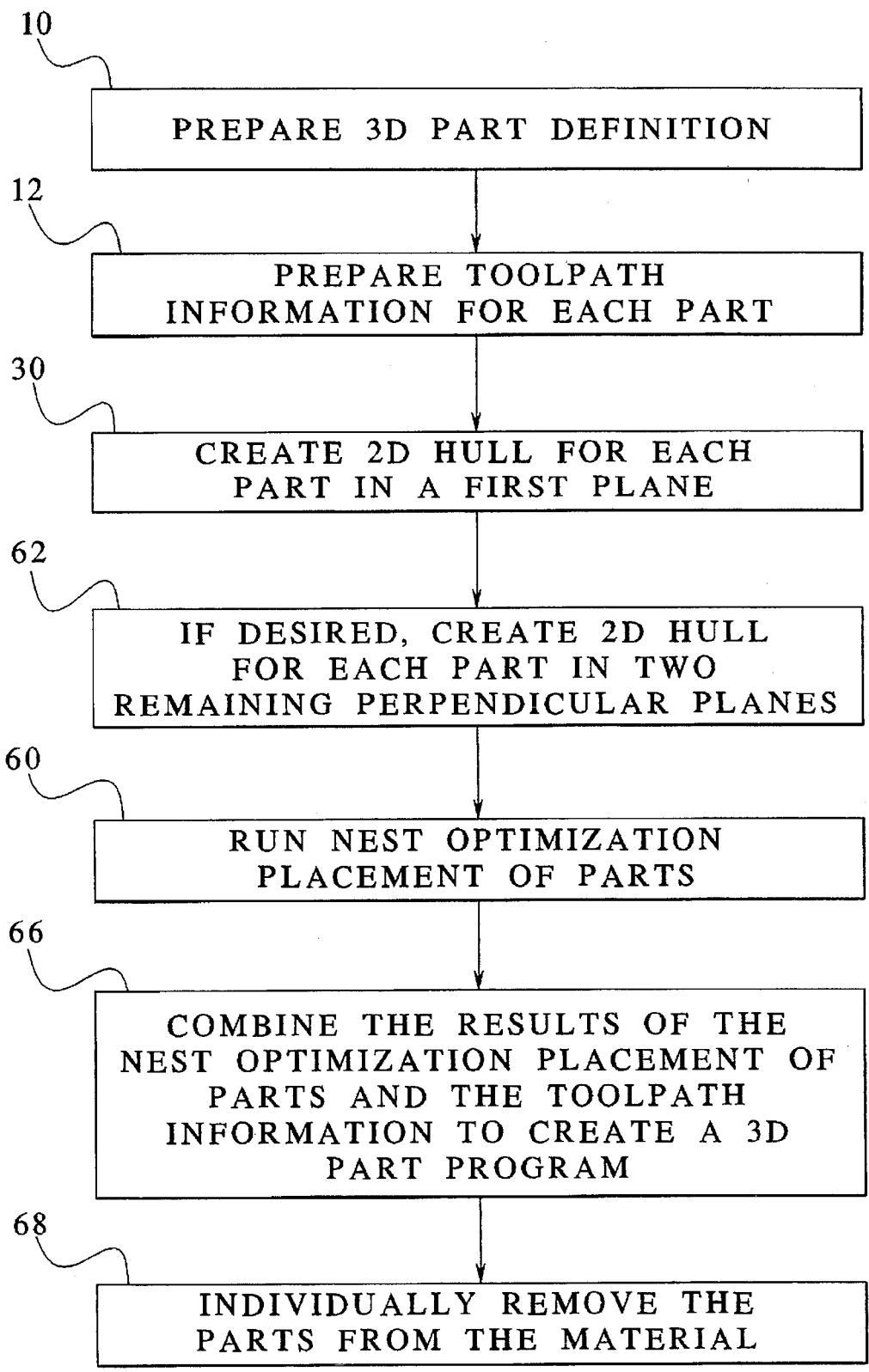
FIG. 7 is a flow chart illustrating the steps of the method of part removal in accordance with the present invention.

Referring to FIG. 7, a method of removal of 3D parts from a material is shown in flow chart fashion according to the present invention.

Figure 2:
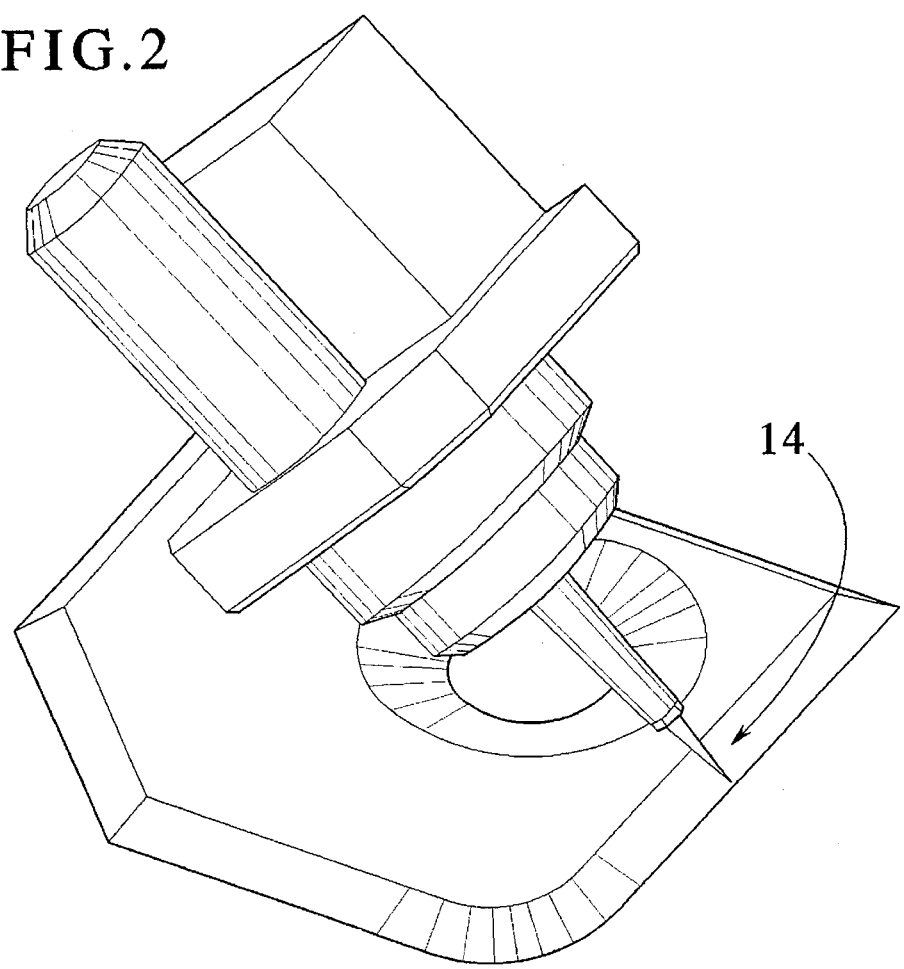
FIG. 2 is a detailed view of an ultrasonic cutter used in the machine of FIG. 1.
Figure 3:
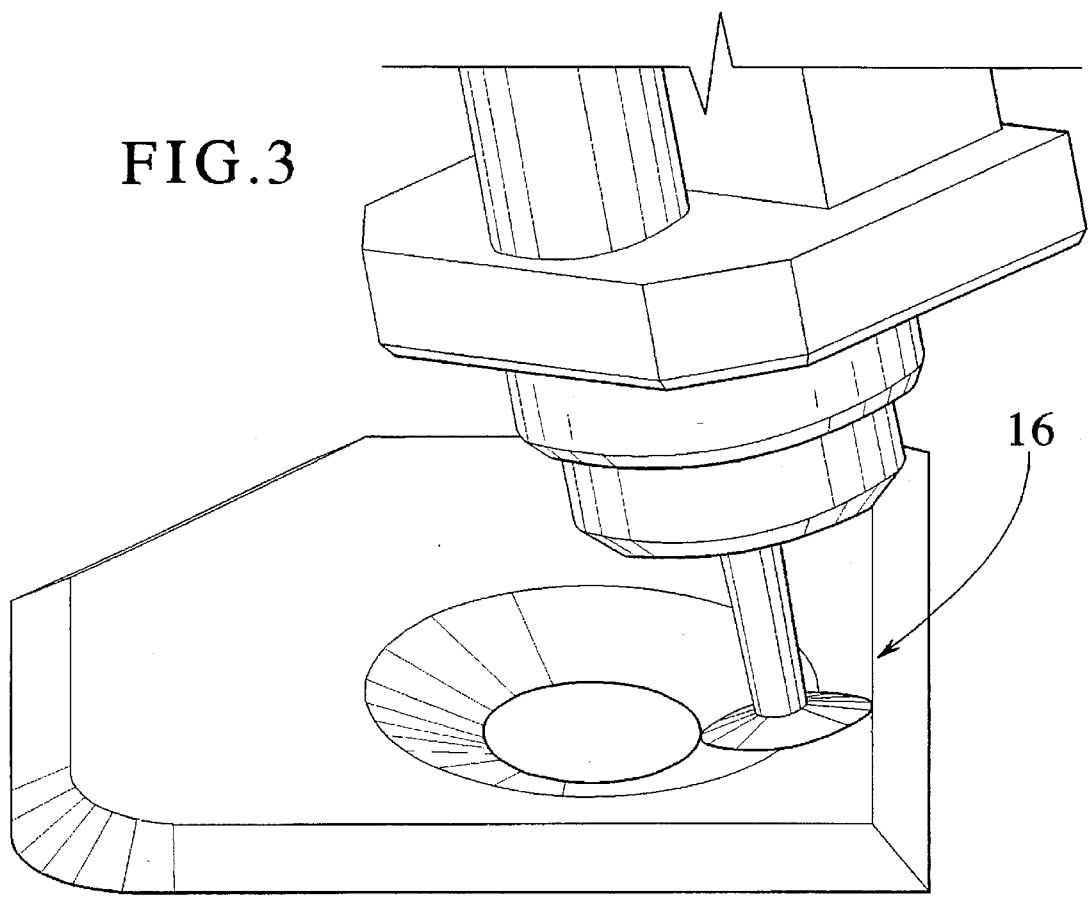
FIG. 3 is a detailed view of a milling cutter which can be used in the machine of FIG. 1.

A standard CAD/NC software module is used to define the three dimensional geometry of the workpiece in step 10. This definition includes information such as any required orientation of the part with respect to the material, such as fiber direction, etc. The NC part of the module allows the definition of the toolpath in step 12 (cutter location) considering all possible available tools such as ultrasonic knives 14 (FIG. 2) of different shapes (disk knives, triangular shaped blades, etc. and milling tools 16 (FIG. 3) like, but not limited to, end milling cutters or spherical cutters. The result of that procedure is stored for every single part in a separate file (usually an APT or CLDATA file).

Figure 1:
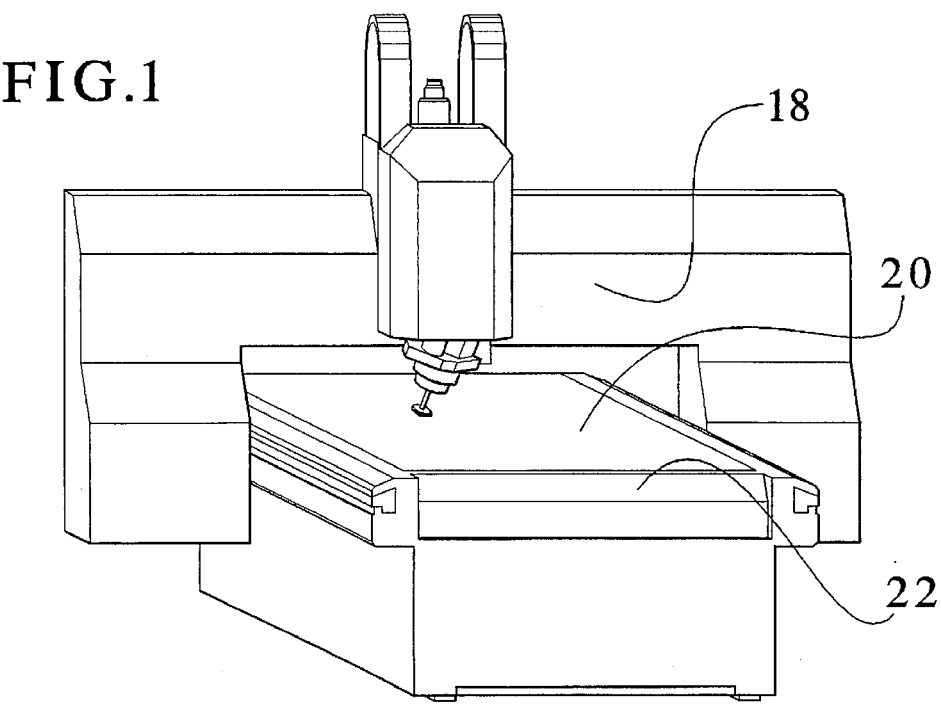
FIG. 1 is a perspective view of a carting machine which can embody the principles of the present invention.

The ultrasonic cutters 14 or milling cutters 16 are tools which can be used in an ultrasonic cutting machine 18 (FIG. 1) which has at least three axes of movement and preferably has five or six axes about which movement can occur, including movement of the cutting device relative to material 20, which is carried on a bed 22 of the machine, along the X axis, the Y axis and the Z axis. Other axes are provided in order to allow for angled cutting of parts from the material 20.

The next process after defining the tool paths in step 12 is "2D mapping" which occurs in step 30 (FIG. 7). Two dimensional mapping takes the 3D geometry information and creates a two dimensional shape or contour, defined as the base of the general prism or cylinder of material, minimal in size, which is necessary to finish that part.

Material outside that solid is not necessary and will not be touched or hurt during the part processing. This two dimensional shape must completely include the projection of the three dimensional part onto the X/Y plane or generally the support plane, such as the machine bed 22. The shape will be bigger at locations where additional material has to be removed during part processing to create complicated surfaces. Two dimensional mapping must keep track of the reference point (start position of machine movements in reference to the origin of the X/Y plane). The result of the 2D mapping process of step 30 is stored in geometry files in whatever format can be processed by the nesting system. (e.g. DXF, IGES files).

Figure 4:
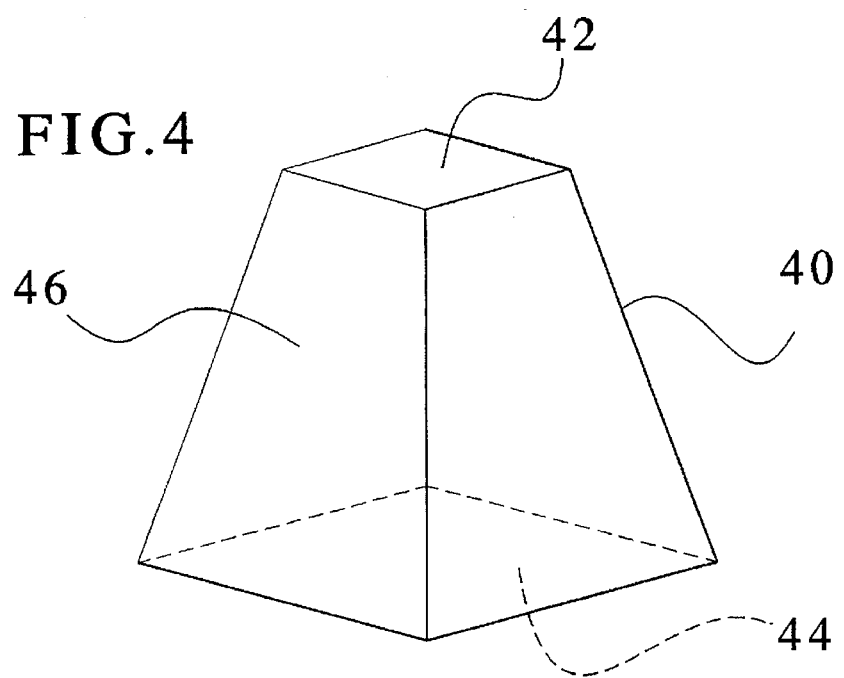
FIG. 4 is a perspective view of a part which can be removed from surrounding material in accordance with the principles of the present invention.
Figure 5:
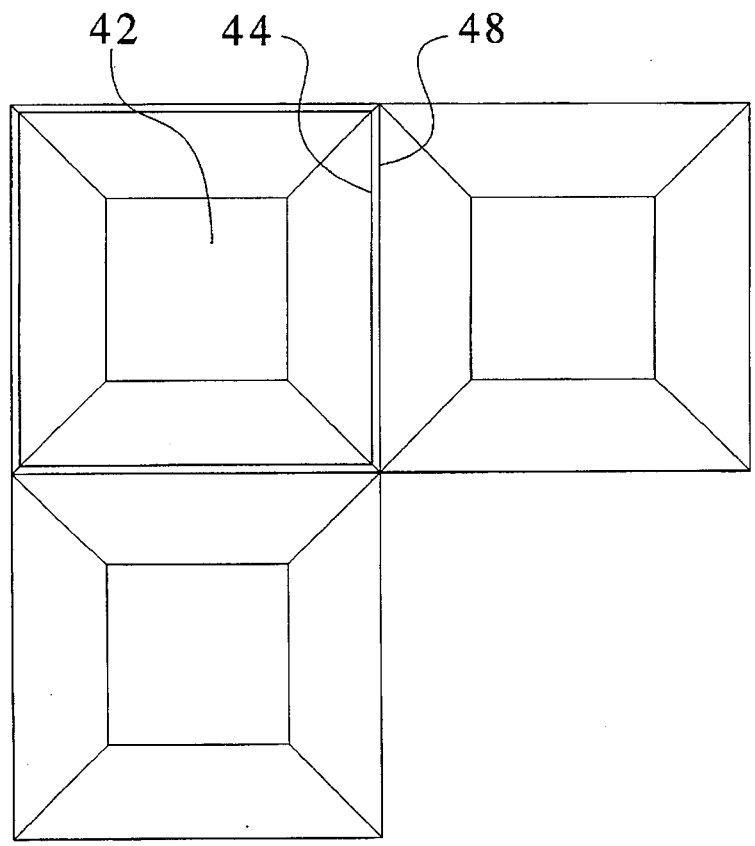
FIG. 5 is a schematic plan view of a 2D mapping of the part of FIG. 4 onto the X/Y plane.

For example, FIG. 4 illustrates a three dimensional part 40 which has a small rectangular top surface 42 and a large rectangular bottom surface 44 with sloping planar sidewalls 46. FIG. 5 illustrates a 2D mapping of this part on to the X/Y plane. It is seen that an outer contour 48 is sized slightly larger than the bottom surface 44 in order to allow for some minimal wastage resulting from the cutting operation. In this arrangement, it is assumed that regular rectangular blocks are first cut from the material with the largest X and Y dimensions corresponding to the largest X and Y dimensions of the part 40.

In step 60 (FIG. 7) a nesting optimization is performed which results in the placement of product patterns in the material 20 so as to optimize usage of the material and to minimize any waste material. This is shown in FIG. 5 in that the rectangular blocks 48 are abutted one to the next so as to leave no spacing in between adjacent blocks.

Step 62 provides an optional procedure whereby even greater material savings can be attained. In this further step a two dimensional hull or contour for each part is created for the remaining two perpendicular planes, that is, the X/Z and Y/Z planes. This information is then used in step 60 to permit a nesting to occur in all three planes so as to take advantage of 3D contours of the articles to achieve a greater material savings.

Figure 6:
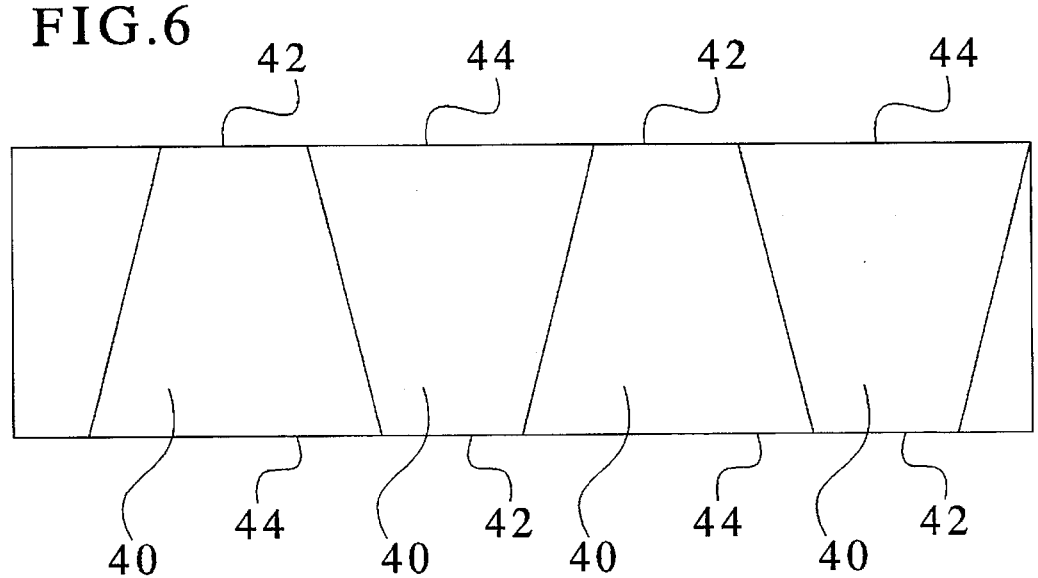
FIG. 6 is a schematic illustration of the 2D mapping of the part of FIG. 4 onto the X/Z plane.

For example, FIG. 6 shows an optimized mapping of the part 40 of FIG. 4 in which alternating patterns are rotated 180° around the X axis in order to take advantage of the complementary sloping surfaces to further minimize waste material. This arrangement, of course, assumes that the characteristics of the material and of the resulting part permit this rotation or inversion of the part, however, this information is part of the information contained in the original definition of the three dimensional part as prepared in step 10.

The results of the nesting optimization placement of parts from step 60 and the tool path information from step 12 is combined in step 66 to create a 3D part program which then can be loaded onto the numerically controlled machine 18 for the part removal. The program includes tool selection information as well as cutting information. The result is that as the machine 18 is operated, all of the parts requested are processed and removed from the material (step 68) without damaging the material to be used for other parts, an overall material utilization is optimized.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

We claim as our invention:

1. A device for forming a plurality of three dimensional parts out of a piece of material with minimal waste, comprising:
   means for defining a three dimensional shape for each part;
   at least one tool for cutting said material, said tool having a predefined cutting width;
   means for mapping each shape as a two dimensional contour onto a plane of said material, and including in said contour said cutting width;
   means for nesting the mapped contours to allocate the two dimensional contours in an optimal manner within said material to minimize the material not contained within the resulting three dimensional shapes;
   means for operating said tool to cut said material along the contours determined by said means for mapping and said means for nesting to achieve each of said three dimensional parts.

2. A device according to claim 1, wherein said at least one tool comprises a plurality of tools, each having its own predefined cutting width and including means for automatically selecting a desired tool from said plurality of tools.

3. A device according to claim 2, wherein said tools comprise at least one of an ultrasonic cutter equipped with a knife and a milling tool.

4. A device according to claim 2, wherein said means for selecting a desired tool comprises an automatic tool changer.

5. A device according to claim 1, wherein said means for defining comprises computer aided design software.

6. A device according to claim 1, wherein said means for mapping comprises mapping software.

7. A device according to claim 1, wherein said means for operating said tool comprises a three axis machine.

8. A device according to claim 1, wherein said means for operating said tool comprises a five axis machine.

9. A device according to claim 1, wherein said means for operating said tool comprises a six axis machine.

10. A device according to claim 1, wherein said means for mapping comprises means for mapping each shape as a two dimensional contour onto a plurality of perpendicular planes of said material.

11. A device according to claim 10, wherein said means for mapping comprises means for mapping each shape as a two dimensional contour onto three perpendicular planes of said material.

12. A method for cutting a plurality of three dimensional parts out of a piece of material with minimal waste with a cutting tool wherein the tool has a predefined cutting width, comprising the steps:
   defining a three dimensional shape for each part;
   mapping each shape as a two dimensional contour onto a plane of said material, including in the contour said cutting width;
   nesting the mapped contours to allocate the two dimensional contours in an optimal manner within said material to minimize the material not contained within the resulting three dimensional shapes;
   operating said tool to cut said material along the contours determined during said mapping and nesting steps to achieve each of said three dimensional parts.

13. A method according to claim 12, wherein said step of operating said tool includes automatically selecting a desired tool from a plurality of tools.

14. A method according to claim 13, wherein said step of selecting comprises selecting at least one of an ultrasonic cutter equipped with a knife and a milling tool.

15. A method according to claim 13, wherein said step of selecting a desired tool comprises using an automatic tool changer.

16. A method according to claim 12, wherein said step of defining comprises using computer aided design software.

17. A method according to claim 12, wherein said step of mapping comprises using mapping software.

18. A method according to claim 12, wherein said step of operating said tool comprises using a three axis machine.

19. A method according to claim 12, wherein said step of operating said tool comprises using a five axis machine.

20. A method according to claim 12, wherein said step of operating said tool comprises using a six axis machine.

21. A method according to claim 12, wherein said step of mapping comprises mapping each shape as a two dimensional contour onto a plurality of perpendicular planes of said material.

22. A method according to claim 12, wherein said step of mapping comprises mapping each shape as a two dimensional contour onto three perpendicular planes of said material.

* * * * *